United States Patent
Feng et al.

(10) Patent No.: US 12,430,942 B2
(45) Date of Patent: Sep. 30, 2025

(54) PATTERN RECOGNITION MODULE AND PATTERN RECOGNITION APPARATUS

(71) Applicants: Beijing BOE Sensor Technology Co., Ltd., Beijing (CN); BOE Technology Group Co., Ltd., Beijing (CN)

(72) Inventors: Yajie Feng, Beijing (CN); Cheng Li, Beijing (CN); Yue Geng, Beijing (CN); Zhonghuan Li, Beijing (CN); Yi Dai, Beijing (CN); Chaoyang Qi, Beijing (CN); Zefei Li, Beijing (CN); Congcong Xi, Beijing (CN); Xinglong Wang, Beijing (CN); Yingzi Wang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/020,093

(22) PCT Filed: Feb. 28, 2022

(86) PCT No.: PCT/CN2022/078422
§ 371 (c)(1),
(2) Date: Feb. 7, 2023

(87) PCT Pub. No.: WO2023/159608
PCT Pub. Date: Aug. 31, 2023

(65) Prior Publication Data
US 2024/0320999 A1  Sep. 26, 2024

(51) Int. Cl.
*G06V 40/13* (2022.01)
(52) U.S. Cl.
CPC ...... *G06V 40/1318* (2022.01); *G06V 40/1329* (2022.01)

(58) Field of Classification Search
CPC .......... G06V 40/1318; G06V 40/1329; G06V 40/1306; G06F 18/00
See application file for complete search history.

(56) References Cited

U.S. PATENT DOCUMENTS 7,139,414 B1    11/2006  Suzuki et al.
2005/0213173 A1  9/2005  Sasaki et al.
(Continued)

FOREIGN PATENT DOCUMENTS

CN    1674038 A     9/2005
CN    201681405 U  12/2010
(Continued)

OTHER PUBLICATIONS

Office Action and Search Report received for Chinese Patent Application No. 202280000344.5, mailed on Jun. 6, 2025, 26 pages (12 pages of English Translation and 14 pages of Original Document).

*Primary Examiner* — Abhishek Sarma
(74) *Attorney, Agent, or Firm* — ArentFox Schiff LLP; Michael Fainberg (57) ABSTRACT

A pattern recognition module and a pattern recognition apparatus. The pattern recognition module includes a pattern recognition substrate, and the pattern recognition substrate includes a pattern recognition area and a non-pattern recognition area located on at least one side of the pattern recognition area; and an anti-static layer, located on the pattern recognition substrate, and an orthographic projection of the anti-static layer on the pattern recognition substrate completely covers the pattern recognition area, extends to the non-pattern recognition area, and overlaps the non-pattern recognition area.

20 Claims, 9 Drawing Sheets

Second protective layer 113

First protective layer 104

Anti-static layer 102(1021)

Anti-glare layer 103

Pattern recognition substrate 101

(56) References Cited

U.S. PATENT DOCUMENTS

| | | | | |
|---|---|---|---|---|
| 2007/0086634 A1* | 4/2007 | Setlak | ............... | G06V 40/1329 |
| | | | | 382/128 |
| 2008/0267462 A1* | 10/2008 | Nelson | ............... | G06V 40/1329 |
| | | | | 382/124 |
| 2021/0406496 A1 | 12/2021 | Tao et al. | | |

FOREIGN PATENT DOCUMENTS

| CN | 202616523 U | 12/2012 |
|---|---|---|
| CN | 102999223 A | 3/2013 |
| CN | 105205470 A | 12/2015 |
| CN | 107665335 A | 2/2018 |
| CN | 107977595 A | 5/2018 |
| CN | 108399350 A | 8/2018 |
| CN | 108535903 A | 9/2018 |
| CN | 108647586 A | 10/2018 |
| CN | 109886115 A | 6/2019 |
| CN | 110139471 A | 8/2019 |
| CN | 111126351 A | 5/2020 |
| CN | 112771484 A | 5/2021 |
| CN | 113380785 A | 9/2021 |

\* cited by examiner

PATTERN RECOGNITION MODULE AND PATTERN RECOGNITION APPARATUS

CROSS REFERENCE TO RELATED APPLICATIONS

The present disclosure is a national phase entry under 35 U.S.C § 371 of International Application No. PCT/CN2022/078422, filed Feb. 28, 2022, and entitled "PATTERN RECOGNITION MODULE AND PATTERN RECOGNITION APPARATUS".

FIELD

The present disclosure relates to the technical field of pattern recognition, in particular to a pattern recognition module and a pattern recognition apparatus.

BACKGROUND

Due to the uniqueness of skin patterns, such as fingerprint patterns or palm patterns, a pattern recognition technology combined with optical imaging is gradually adopted by a pattern recognition apparatus for identity verification. The pattern recognition apparatus may be used independently as an identity verification apparatus for airports, banks and other occasions, or it may also be combined with mobile terminals to provide identity verification, electronic payment and other functions for the mobile terminals.

SUMMARY

Embodiments of the present disclosure provide a pattern recognition module and a pattern recognition apparatus, and a solution is as follows.

In an aspect, the embodiments of the present disclosure provide the pattern recognition module, including:
  a pattern recognition substrate, the pattern recognition substrate includes a pattern recognition area, and a non-pattern recognition area located on at least one side of the pattern recognition area; and
  an anti-static layer, located on the pattern recognition substrate, and an orthographic projection of the anti-static layer on the pattern recognition substrate completely covers the pattern recognition area and extends to the non-pattern recognition area, and overlaps the non-pattern recognition area.

In some embodiments, the above pattern recognition module provided by the embodiments of the present disclosure further includes an anti-glare layer and a first protective layer, the anti-static layer is disposed between the anti-glare layer and the first protective layer, and the anti-glare layer is arranged adjacent to the pattern recognition substrate.

In some embodiments, in the above pattern recognition module provided by the embodiments of the present disclosure, the anti-static layer is a conductive layer.

In some embodiments, in the above pattern recognition module provided by the embodiments of the present disclosure, the anti-static layer is a high-resistance film.

In some embodiments, in the above pattern recognition module provided by the embodiment of the present disclosure, the anti-static layer includes a conductive layer and a high-resistance film which are arranged in a stacked mode, and the conductive layer is disposed between the pattern recognition substrate and the high-resistance film.

In some embodiments, in the above pattern recognition module provided by the embodiments of the present disclosure, the anti-static layer includes a conductive layer and a high-resistance film which are arranged in a stacked mode, and the high-resistance film is disposed between the pattern recognition substrate and the conductive layer.

In some embodiments, in the above pattern recognition module provided by the embodiments of the present disclosure, an orthographic projection of the high-resistance film on the pattern recognition substrate is located within an orthographic projection of the conductive layer on the pattern recognition substrate.

In some embodiments, in the above pattern recognition module provided by the embodiments of the present disclosure, a sheet resistance of the conductive layer is larger than or equal to 10 $\Omega/\square$ and less than or equal to 100 $\Omega/\square$.

In some embodiments, in the above pattern recognition module provided by the embodiments of the present disclosure, a transmissivity of the conductive layer is larger than 80%.

In some embodiments, in the above pattern recognition module provided by the embodiments of the present disclosure, a thickness of the conductive layer in a direction perpendicular to the pattern recognition substrate is larger than or equal to 300 Å and less than or equal to 2000 Å.

In some embodiments, in the above pattern recognition module provided by the embodiment of the present disclosure, a sheet resistance of the high-resistance film is larger than or equal to $10^8$ $\Omega/\square$.

In some embodiments, in the above pattern recognition module provided by the embodiments of the present disclosure, a transmissivity of the high-resistance film is larger than 80%.

In some embodiments, in the above pattern recognition module provided by the embodiment of the present disclosure, a thickness of the high-resistance film in a direction perpendicular to the pattern recognition substrate is larger than or equal to 100 Å and less than or equal to 300 Å.

In some embodiments, in the above pattern recognition module provided by the embodiments of the present disclosure, the anti-static layer is of a planar structure or a grid structure.

In some embodiments, in the above pattern recognition module provided by the embodiments of the present disclosure, the pattern recognition substrate further includes a conductive structure, and the conductive structure is located on a side of the anti-static layer away from the pattern recognition substrate, located in the non-pattern recognition area and arranged in contact with the conductive layer.

In some embodiments, the above pattern recognition module provided by the embodiments of the present disclosure further includes a grounding shell, and the grounding shell is arranged in the non-pattern recognition area, and is electrically connected with the conductive structure.

In some embodiments, in the above pattern recognition module provided by the embodiment of the present disclosure, a surface of the grounding shell has insulating paint beyond a contact surface with the conductive structure and a grounding point.

In some embodiments, the above pattern recognition module provided by the embodiments of the present disclosure further includes a gate drive chip;
  the non-pattern recognition area surrounds the pattern recognition area, the non-pattern recognition area includes a first non-pattern recognition area and a second non-pattern recognition area which are arranged opposite to each other, the first non-pattern recognition area is provided with the gate drive chip, and the second non-pattern recognition area is provided with the conductive structure;

in the first non-pattern recognition area, an orthographic projection of the gate drive chip on the pattern recognition substrate does not overlap an orthographic projection of the anti-static layer on the pattern recognition substrate; and in the second non-pattern recognition area, an orthographic projection of the conductive structure on the pattern recognition substrate approximately coincides with the orthographic projection of the anti-static layer on the pattern recognition substrate.

In some embodiments, in the above pattern recognition module provided by the embodiments of the present disclosure, the first non-pattern recognition area is further provided with the conductive structure, and in the first non-pattern recognition area, the orthographic projection of the conductive structure on the pattern recognition substrate approximately coincides with the orthographic projection of the anti-static layer on the pattern recognition substrate.

In some embodiments, in the above pattern recognition module provided by the embodiments of the present disclosure, the conductive structure is conductive foam.

In some embodiments, in the above pattern recognition module provided by the embodiments of the present disclosure, the anti-glare layer is at least arranged in the pattern recognition area.

In some embodiments, in the above pattern recognition module provided by the embodiments of the present disclosure, an orthographic projection of the anti-glare layer on the pattern recognition substrate is larger than the pattern recognition area and located within the orthographic projection of the anti-static layer on the pattern recognition substrate.

In some embodiments, in the above pattern recognition module provided by the embodiments of the present disclosure, a thickness of the anti-glare layer in a direction perpendicular to the pattern recognition substrate is larger than or equal to 2 μm and less than or equal to 10 μm.

In some embodiments, in the above pattern recognition module provided by the embodiments of the present disclosure, an orthographic projection of the first protective layer on the pattern recognition substrate is larger than the pattern recognition area and located within an orthographic projection of the anti-glare layer on the pattern recognition substrate.

In some embodiments, in the above pattern recognition module provided by the embodiments of the present disclosure, a material of the first protective layer includes silicon nitride, and a hardness of the first protective layer is larger than or equal to 6 H.

In some embodiments, in the above pattern recognition module provided by the embodiments of the present disclosure, the material of the first protective layer further includes monox, and a nitrogen content in the first protective layer is larger than or equal to 60%.

In some embodiments, in the above pattern recognition module provided by the embodiments of the present disclosure, a thickness of the first protective layer in a direction perpendicular to the pattern recognition substrate is larger than or equal to 300 nm and less than or equal to 10000 nm.

In some embodiments, the above pattern recognition module provided by the embodiments of the present disclosure further includes a second protective layer, the second protective layer is located on a side of the first protective layer away from the anti-static layer, and an orthographic projection of the second protective layer on the pattern recognition substrate approximately coincides with an orthographic projection of the first protective layer on the pattern recognition substrate.

In some embodiments, in the above pattern recognition module provided by the embodiments of the present disclosure, the second protective layer is configured to prevent fingerprint residues.

In some embodiments, in the above pattern recognition module provided by the embodiments of the present disclosure, a thickness of the second protective layer in the direction perpendicular to the pattern recognition substrate is larger than or equal to 100 Å and less than or equal to 500 Å.

In some embodiments, the above pattern recognition module provided by the embodiments of the present disclosure further includes a flexible printed circuit, the flexible printed circuit is electrically connected with the gate drive chip, the flexible printed circuit includes a bent area, and a length of the bent area is larger than or equal to 14 mm.

In some embodiments, in the above pattern recognition module provided by the embodiments of the present disclosure, the flexible printed circuit is of a copper grid structure.

In some embodiments, the above pattern recognition module provided by the embodiments of the present disclosure further includes a stiffening plate, and the stiffening plate includes a body part and a handle part which are integrally arranged; and the flexible printed circuit further includes an unbent area, the unbent area is attached to the body part, and the handle part is located on a side of the body part adjacent to the bent area.

In some embodiments, in the above pattern recognition module provided by the embodiments of the present disclosure, the handle part includes a hollowed-out structure.

In some embodiments, in the above pattern recognition module provided by the embodiments of the present disclosure, the body part includes a crack arrest groove, and the crack arrest groove is arranged adjacent to two sides of the handle part in an extension direction.

In some embodiments, the above pattern recognition module provided by the embodiments of the present disclosure further includes a chip-on-film and a readout integrated circuit (ROIC), and the ROIC is arranged on the chip-on-film, and is electrically connected with the chip-on-film; and the non-pattern recognition area includes a third non-pattern recognition area and a fourth non-pattern recognition area which are arranged opposite to each other, the third non-pattern recognition area is connected with the first non-pattern recognition area and the second non-pattern recognition area, the fourth non-pattern recognition area is connected with the first non-pattern recognition area and the second non-pattern recognition area, and the third non-pattern recognition area and the fourth non-pattern recognition area are both provided with the chip-on-films.

In some embodiments, the above pattern recognition module provided by the embodiments of the present disclosure further includes a black adhesive, the black adhesive is located on a side of the ROIC away from the chip-on-film, and an orthographic projection of the ROIC on the chip-on-film is located within an orthographic projection of the black adhesive on the chip-on-film.

In another aspect, the embodiments of the present disclosure provide the pattern recognition apparatus, including a pattern recognition module and a backlight module, and the pattern recognition module is the above pattern recognition module provided by the embodiments of the present disclosure, and the pattern recognition module is located on a light emitting side of the backlight module.

DETAILED DESCRIPTION OF THE EMBODIMENTS

To make objectives, technical solutions and advantages of embodiments of the present disclosure clearer, the technical solutions of the embodiments of the present disclosure will be clearly and completely described below in conjunction with the accompanying drawings of the embodiments of the present disclosure. It needs to be noted that the sizes and shapes of all figures in the accompanying drawings do not reflect true scales, and are only intended to schematically illustrate the content of the present disclosure. The same or similar reference numerals represent the same or similar elements or elements with the same or similar functions all the time.

Unless otherwise defined, technical or scientific terms used herein shall have the ordinary meanings understood by those ordinarily skilled in the art to which the present disclosure pertains. The words "first", "second" and the similar words used in specification and claims of the present disclosure do not indicate any order, quantity or importance, but are only used to distinguish different components. The words "comprise" or "include" and the like indicate that an element or item appearing before such the word covers listed elements or items appearing after the word and equivalents thereof, and do not exclude other elements or items. "Inner", "outer", "upper" and "lower" and the like are only used to represent relative position relationships, and the relative position relationships may also change accordingly after an absolute position of a described object is changed.

A pattern recognition apparatus includes a backlight module and a pattern recognition module. After a light source of the backlight module is lit, backlight reaches the positions of valley and ridge of a finger through the pattern recognition module, and the light reflected by the valley and ridge of the finger enters an optical fingerprint sensor included in the pattern recognition module. Since the light intensity reflected by the valley and ridge is different, the optical fingerprint sensor generates different electrical signals according to the difference of the above reflected light intensity, so that the valley and ridge of fingerprint are recognized, and fingerprint collection is realized. However, the finger is in direct contact with the pattern recognition module, it is very prone to generating electro-static discharge (ESD), which interferes with the optical fingerprint sensor and affects a fingerprint recognition effect.

Figure 1:
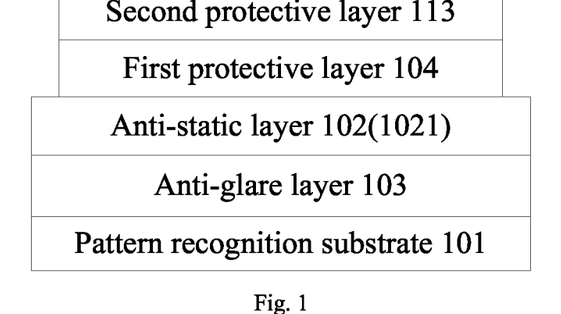
FIG. 1 is a sectional view of a pattern recognition module provided by an embodiment of the present disclosure.
Figure 2:
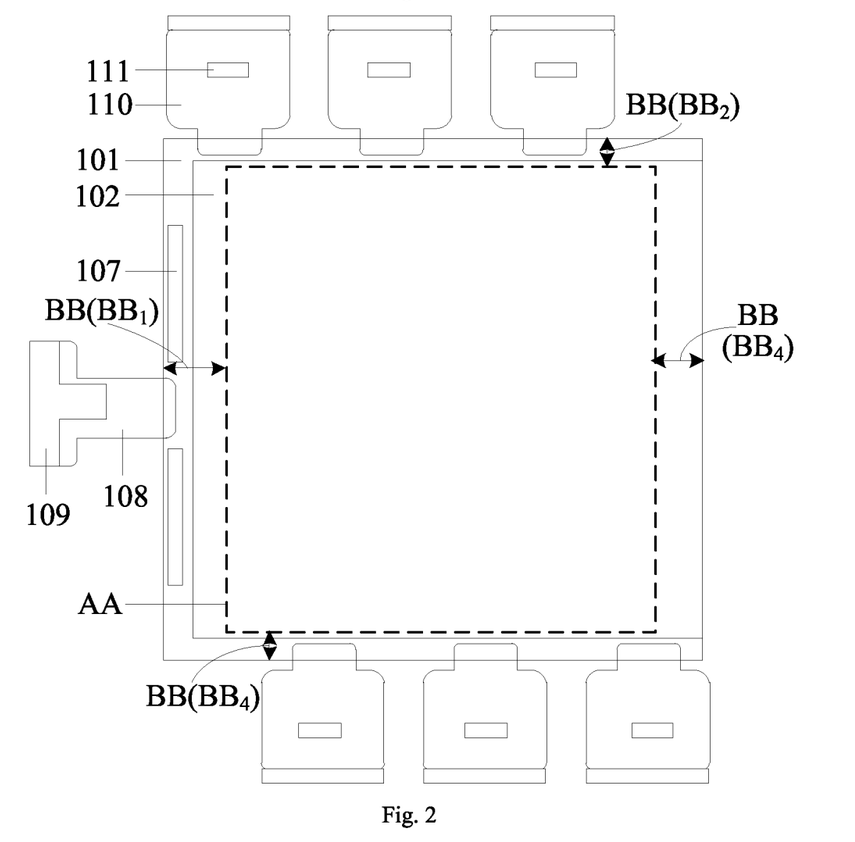
FIG. 2 is a top view of the pattern recognition module shown in FIG. 1.

In order to improve the above problem existing in the related art, the embodiments of the present disclosure provide a pattern recognition module, which can be used for single finger or multi-finger (such as, four-finger) pattern collection, as shown in FIG. 1 and FIG. 2, including:

a pattern recognition substrate 101, the pattern recognition substrate 101 includes a pattern recognition area AA, and a non-pattern recognition area BB located on at least one side of the pattern recognition area AA; and optionally, a resolution of the pattern recognition area AA is 1600×1500;

an anti-static layer 102, located on the pattern recognition substrate 101, an orthographic projection of the anti-static layer 102 on the pattern recognition substrate 101 completely covers the pattern recognition area AA and extends to the non-pattern recognition area BB, and overlaps the non-pattern recognition area BB. Optionally, the anti-static layer 102 may be realized by a film coating process, a process is simple, a product yield is high, and the anti-static layer 102 made by the film coating process has a planar structure. Of course, in some embodiments, in order to increase the transmissivity, the anti-static layer 102 may be of a grid structure, and optionally, a size of a mesh of the grid structure may be less than a size of a sub-pixel.

By adding the anti-static layer 102 on the pattern recognition substrate 101, static electricity can be effectively prevented from entering an interior of the pattern recognition substrate 101 and interfering with its normal work. Therefore, an anti-static ability of the pattern recognition module is effectively enhanced, which is conducive to improving the pattern recognition effect.

In some embodiments, the above pattern recognition module provided by the embodiments of the present disclosure, as shown in FIG. 1 to FIG. 7, may further include an anti-glare layer 103 and a first protective layer 104, the anti-static layer 102 is disposed between the anti-glare layer 103 and the first protective layer 104, and the anti-glare layer 103 is arranged adjacent to the pattern recognition substrate 101.

In some embodiments, in the above pattern recognition module provided by the embodiments of the present disclosure, as shown in FIG. 1 and FIG. 2, the anti-static layer 102 may be a conductive layer 1021, so as to guide out the static electricity through the conductive layer 1021, the static electricity is prevented from entering the interior of the pattern recognition substrate 101, so that bad spots, bad lines and other defects cannot be produced by the static electricity, and the normal image collection quality of the pattern recognition substrate 101 is ensured.

Optionally, in order to realize a better conductive characteristic, a sheet resistance of the conductive layer 1021 may be larger than or equal to 10 Ω/□ and less than or equal to 100 Ω/□. In order to ensure that the conductive layer 1021 does not affect an image of a fingerprint, a thickness of the conductive layer 1021 in a direction perpendicular to the pattern recognition substrate 101 may be larger than or equal to 300 Å and less than or equal to 2000 Å (such as 500 Å, 1000 Å and 1500 Å), and the transmissivity of the conductive layer 1021 may be larger than 80%. In some embodiments, the conductive layer 1021 may be made of materials meeting the above parameters, such as indium tin oxide (ITO).

Figure 3:
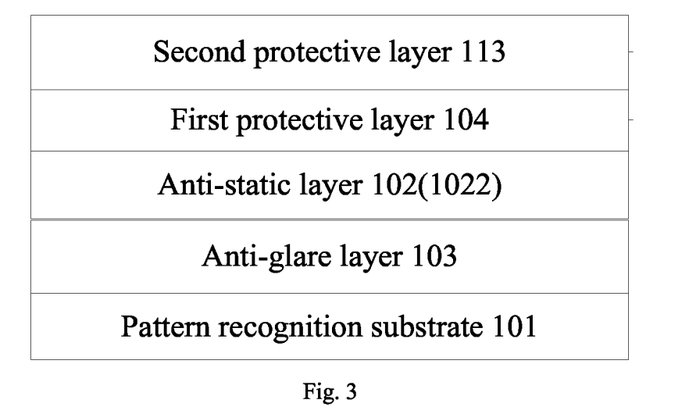
FIG. 3 is another sectional view of a pattern recognition module provided by an embodiment of the present disclosure.
Figure 4:
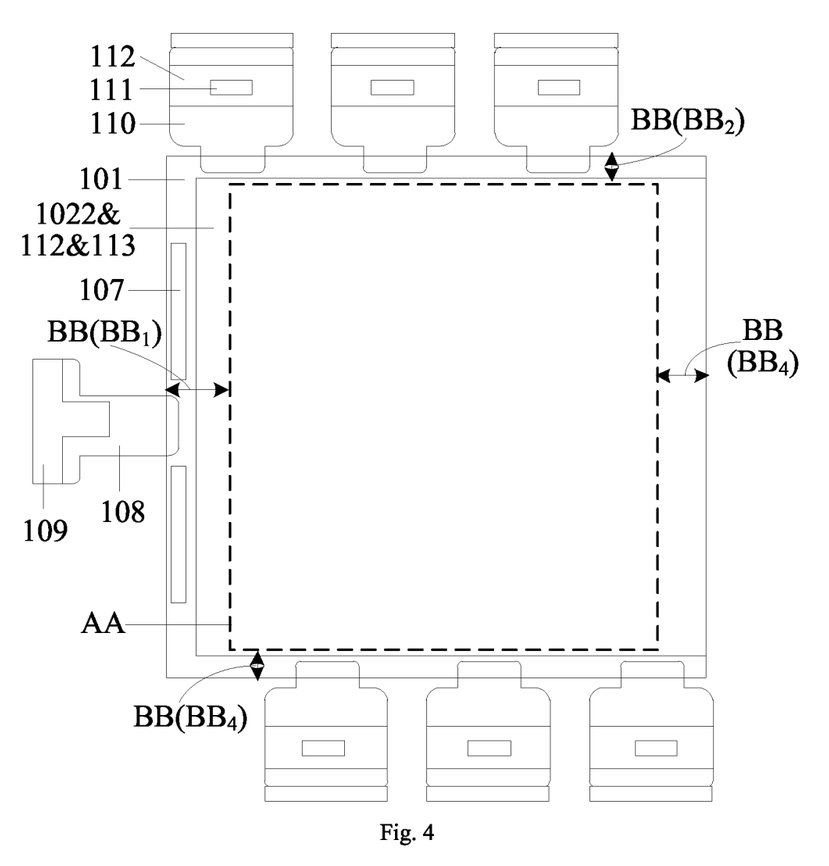
FIG. 4 is a top view of the pattern recognition module shown in FIG. 3.
Figure 5:
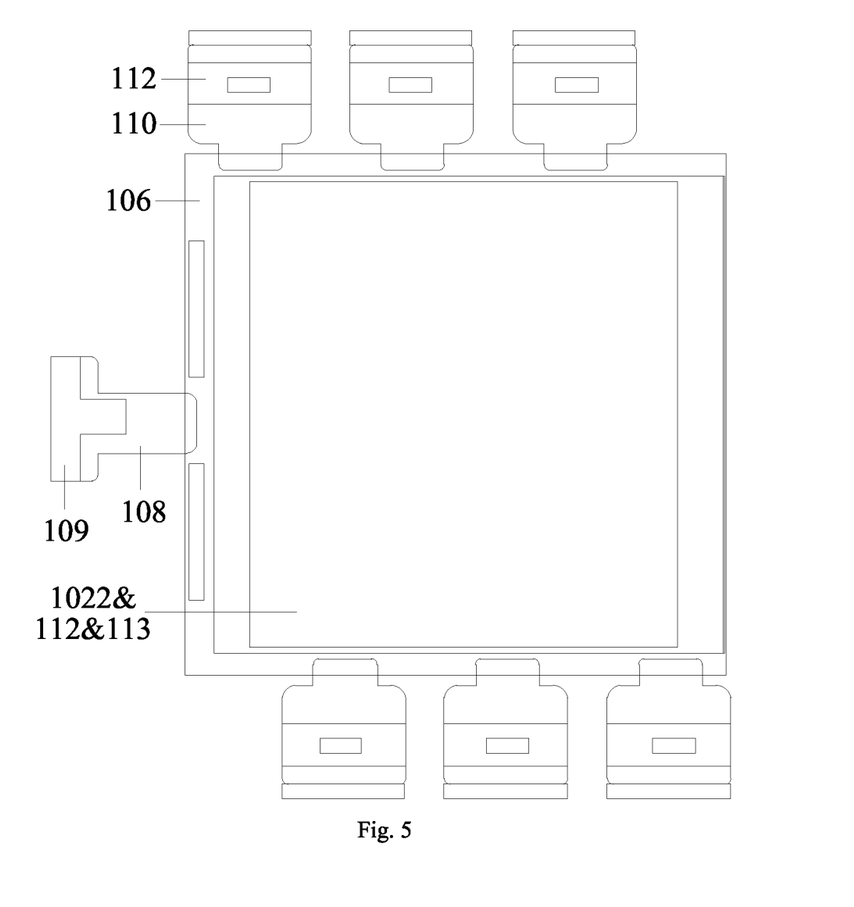
FIG. 5 is another top view of the pattern recognition module shown in FIG. 3.

In some embodiments, in the above pattern recognition module provided by the embodiments of the present disclosure, as shown in FIG. 3 to FIG. 5, the anti-static layer 102 may be a high-resistance film 1022, so as to block the static electricity on a side of the high-resistance film 1022 away from the pattern recognition substrate 101 by using an insulation characteristic of the high-resistance film 1022, the static electricity is prevented from entering the interior of the pattern recognition substrate 101, so that bad spots, bad lines and other defects cannot be produced by the static electricity, and the normal image collection quality of the pattern recognition substrate 101 is ensured. In some embodiments, in order to ensure a better blocking effect, a sheet resistance of the high-resistance film 1022 may be larger than or equal to $10^8$ Ω/□. At the same time, a better fingerprint image is ensured, a thickness of the high-resistance film 1022 in the direction perpendicular to the pattern recognition substrate 101 is larger than or equal to 100 Å and less than or equal to 300 Å (such as 150 Å, 200 Å and 250 Å), and the transmissivity of the high-resistance film 1022 is larger than 80%.

Figure 6:
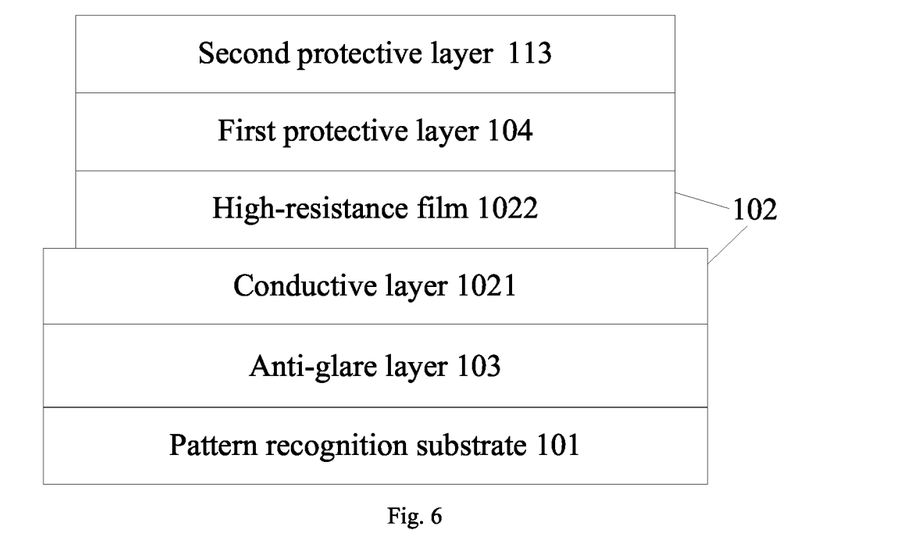
FIG. 6 is yet another sectional view of a pattern recognition module provided by an embodiment of the present disclosure.
Figure 7:
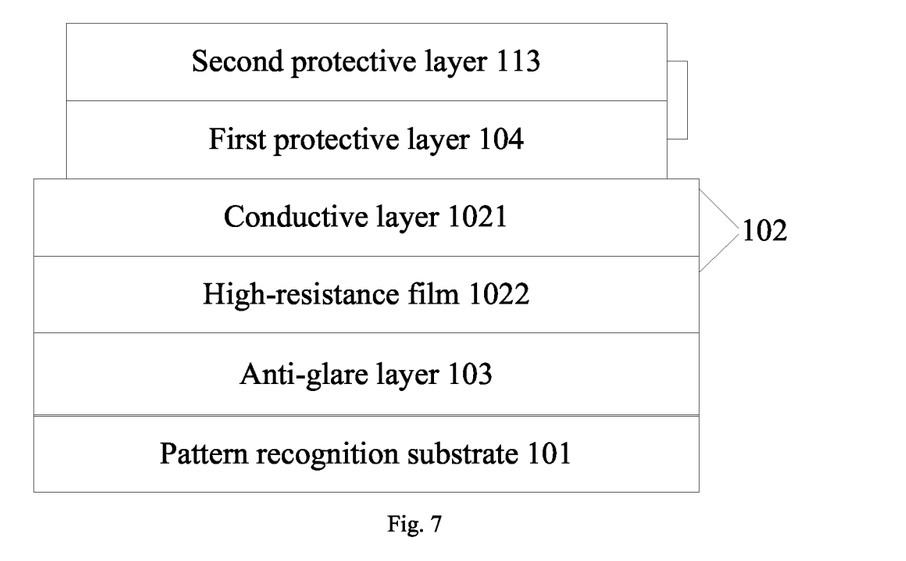
FIG. 7 is yet another sectional view of a pattern recognition module provided by an embodiment of the present disclosure.

In some embodiments, in the above pattern recognition module provided by the embodiments of the present disclosure, as shown in FIG. 6 and FIG. 7, the anti-static layer 102 may further include a conductive layer 1021 and a high-resistance film 1022 which are arranged in a stacked mode, the conductive layer 1021 may be disposed between the pattern recognition substrate 101 and the high-resistance film 1022, or, the high-resistance film 1022 is disposed between the pattern recognition substrate 101 and the conductive layer 1021. Specifically, as shown in FIG. 6, in a case that the conductive layer 1021 is disposed between the pattern recognition substrate 101 and the high-resistance film 1022, the high-resistance film 1022 is closer to a contact surface between the finger and the pattern recognition substrate 101 than the conductive layer 1021. When more static electricity brought by the finger reaches the contact surface of the pattern recognition substrate 101, first, part of the voltage is reduced through the high-resistance film 1022, and the rest of static electricity reaches the conductive layer 1021 and then is led out by the conductive layer 1021, so that the static electricity cannot reach the pattern recognition substrate 101, which ensures that the pattern recognition substrate 101 can normally collect the fingerprint image. As shown in FIG. 7, in a case that the high-resistance film 1022 is disposed between the pattern recognition substrate 101 and the conductive layer 1021, the conductive layer 1021 is closer to the contact surface between the finger and the pattern recognition substrate 101 than the high-resistance film 1022. When more static electricity brought by the finger reaches the contact surface of the pattern recognition substrate 101, first, part of the static electricity is led out through the conductive layer 1021, the rest of the static electricity then reaches the high-resistance film 1022, and the rest of the static electricity may be blocked outside the pattern recognition substrate 101 through the insulation characteristic of the high-resistance film 1022, which ensures that the pattern recognition substrate 101 can normally collect the fingerprint image.

Optionally, when the anti-static layer 102 includes the conductive layer 1021 and the high-resistance film 1022 which are arranged in a stacked mode, the parameters such as the sheet resistance, the thickness and the transmissivity of the conductive layer 1021 may refer to the relevant parameters when the anti-static layer 102 only includes the conductive layer 1021, and the parameters such as the resistance, the thickness and the transmissivity of the high-resistance film 1022 may refer to the relevant parameters when the anti-static layer 102 only includes the high-resistance film 1022, which will not be repeated here.

In addition, it can be seen from the above contents that comparing four anti-static solutions, in a case that the anti-static layer 102 includes the conductive layer 1021 and the high-resistance film 1022 which are arranged in a stacked mode, the anti-static ability of the pattern recognition module is better than the anti-static ability when the anti-static layer 102 only includes the conductive layer 1021 or the high-resistance film 1022. Anti-static level requirements in the related art are divided into four levels: a first level is to be in direct contact with 2 KV, and in air contact with 2 KV; a second level is to be in direct contact with 4 KV, and in air contact with 4 KV; a third level is to be in direct contact with 6 KV, and in air contact with 8 KV; a fourth level is to be in direct contact with 8 KV, and in air contact with 15 KV; and the above anti-static layer 102 may be adaptively selected according to different anti-static level requirements. In addition, in a case that the conductive layer 1021 is disposed between the pattern recognition substrate 101 and the high-resistance film 1022, the anti-static requirements for the high-resistance film 1022 are high. In a case that the high-resistance film 1022 is disposed between the pattern recognition substrate 101 and the conductive layer 1021, the anti-static requirements for the conductive layer 1021 are high. Therefore, during specific implementation, the structure of the anti-static layer 102 may further be flexibly selected in combination with a coating process level and the anti-static requirements.

Figure 8:
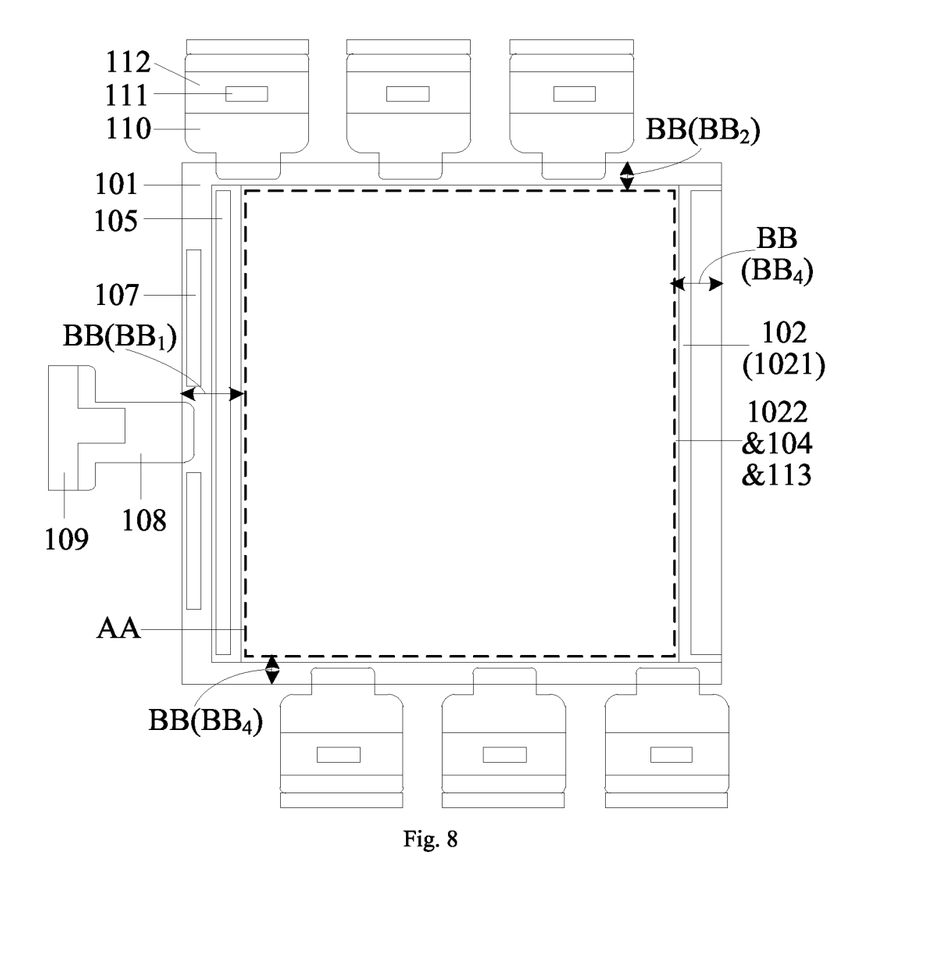
FIG. 8 is top view of the pattern recognition module shown in FIG. 6 and FIG. 7.

In some embodiments, in the above pattern recognition module provided by the embodiments of the present disclosure, as shown in FIG. 8, when the anti-static layer 102 has the high-resistance film 1022 and the conductive layer 1021 at the same time, the orthographic projection of the high-resistance film 1022 on the pattern recognition substrate 101 may be set to be located within the orthographic projection of the conductive layer 1021 on the pattern recognition substrate 101. In this way, it can be ensured that part of the conductive layer 1021 does not overlap the high-resistance film 1022, so as to facilitate the grounding of the non-overlapping conductive layer 1021.

It should be understood that when the high-resistance film 1022 is disposed between the conductive layer 1021 and the pattern recognition substrate 101, the high-resistance film 1022 will not cover the conductive layer 1021. Therefore, the orthographic projection of the high-resistance film 1022 on the pattern recognition substrate 101 may be located within the orthographic projection of the conductive layer 1021 on the pattern recognition substrate 101, or approximately coincide with the orthographic projection of the conductive layer 1021 on the pattern recognition substrate 101, that is, they exactly coincide or are within an allowable error range, so as to improve flatness of the conductive layer 1021.

Figure 9:
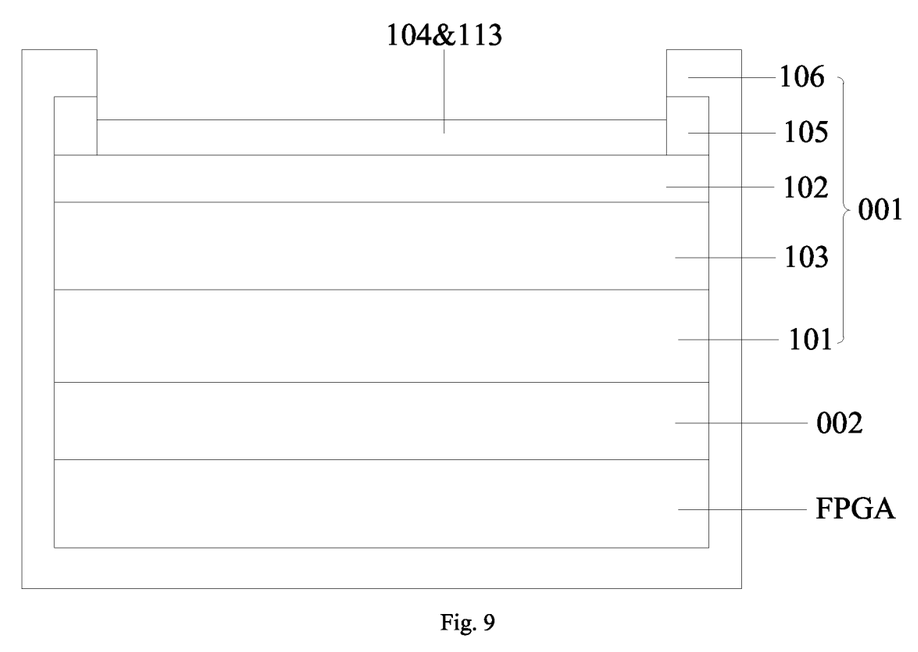
FIG. 9 is a sectional view of a pattern recognition apparatus provided by an embodiment of the present disclosure.
Figure 10:
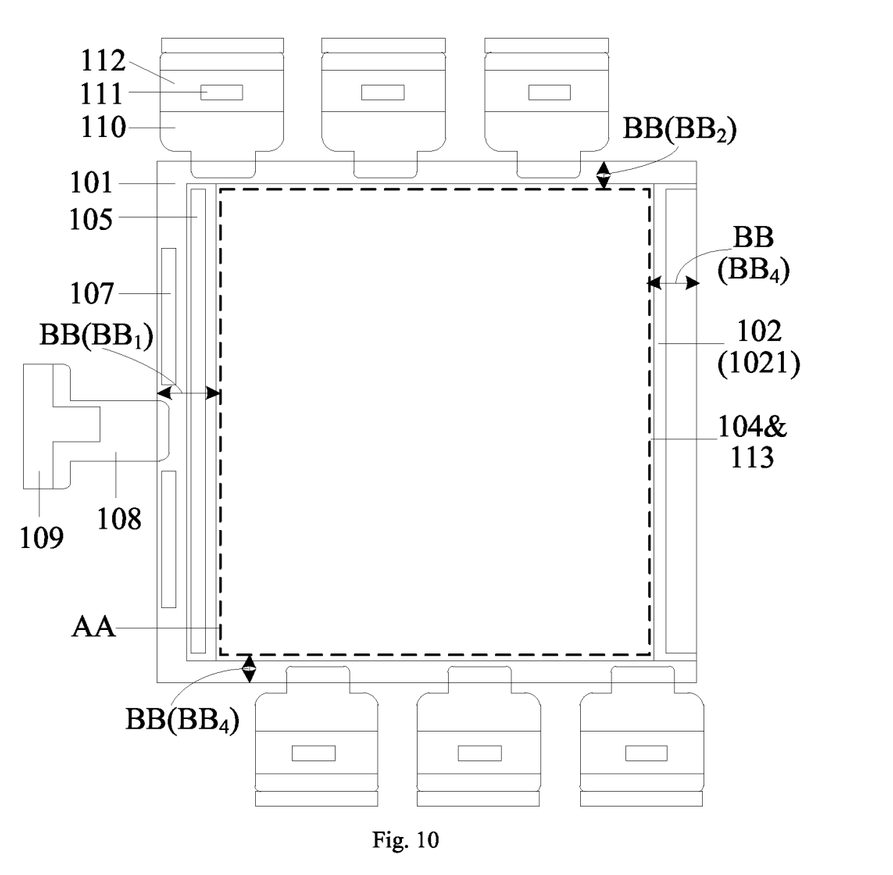
FIG. 10 is yet another top view of the pattern recognition module shown in FIG. 1.

In some embodiments, in the above pattern recognition module provided by the embodiments of the present disclosure, as shown in FIG. 8 to FIG. 10, the pattern recognition substrate 101 may further include a conductive structure 105, the conductive structure 105 is located on a side of the anti-static layer 102 away from the pattern recognition substrate 101, and the conductive structure 105 is located in the non-pattern recognition area BB and arranged in contact with the conductive layer 1021. Since the larger an area of the conductive structure 105 is, the better the contact effect between the conductive structure 105 and the conductive layer 1021 is, and the more conducive to the rapid guidance of the static electricity, a contact area between the conductive structure 105 and the conductive layer 1021 should be as large as possible. Optionally, the area of the conductive structure 105 is larger than or equal to 10 mm$^2$.

Figure 11:
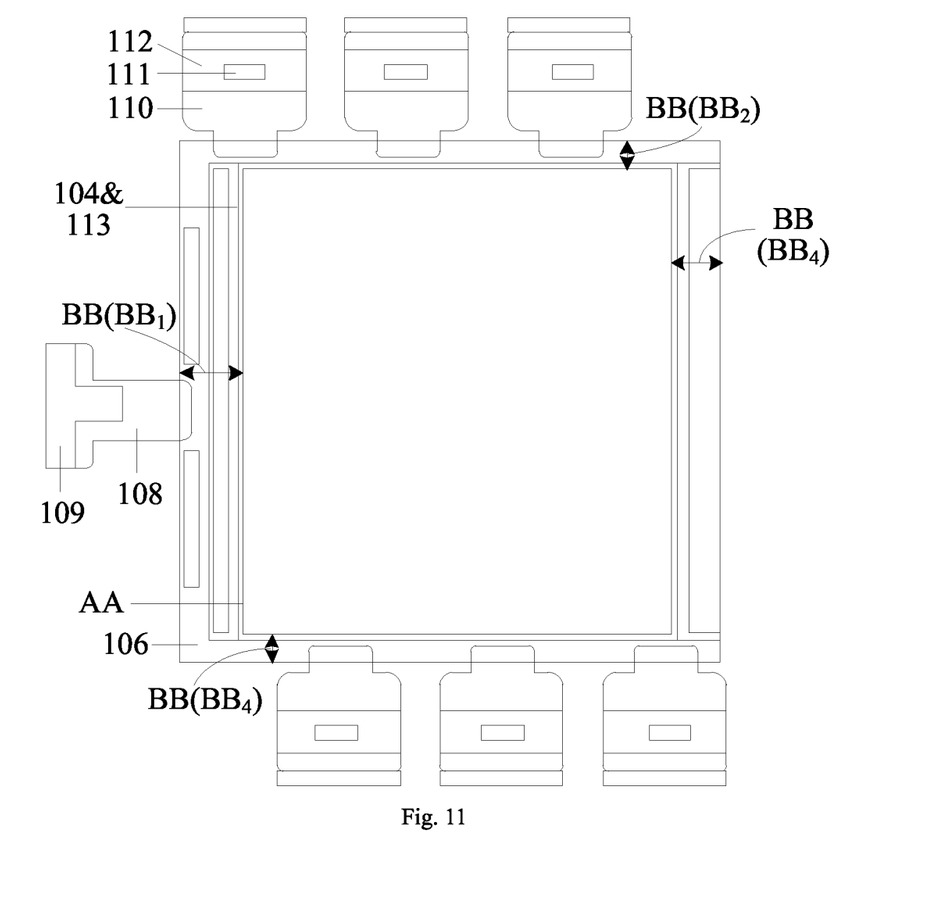
FIG. 11 is yet another top view of the pattern recognition module shown in FIG. 1.

In some embodiments, the above pattern recognition module provided by the embodiments of the present disclosure, as shown in FIG. 9 and FIG. 11, may further include a grounding shell 106. In order to expose the pattern recognition area AA, the grounding shell 106 may be set in the non-pattern recognition area BB, and the grounding shell 106 may be electrically connected with the conductive structure 105. The grounding shell 106 may be in contact and electrically connected with a surface of a side of the conductive structure 105 away from the anti-static layer 102. In this way, the static electricity diffused on the anti-static layer 102 may be guided out by grounding the conductive structure 105 and the grounding shell 106.

In some embodiments, in the above pattern recognition module provided by the embodiments of the present disclosure, a surface of the grounding shell 106 has insulating paint beyond the contact surface with the conductive structure 105 and a grounding point, that is, an area where the grounding shell 106 needs to conduct electricity is not sprayed with the insulating paint, while an area where the grounding shell 106 does not need to conduct electricity is sprayed with the insulating paint, so as to protect the grounding shell 106 through the insulating paint, and prevent water vapor and the like in the air from corroding the grounding shell 106.

In some embodiments, the above pattern recognition module provided by the embodiments of the present disclosure, as shown in FIG. 8 and FIG. 10, may further include a gate drive chip (gate IC) 107. The non-pattern recognition area BB surrounds the pattern recognition area AA, the non-pattern recognition area BB includes a first non-pattern recognition area BB$_1$ and a second non-pattern recognition area BB$_2$ which are arranged opposite to each other, the first non-pattern recognition area BB$_1$ is provided with the gate IC 107, in the first non-pattern recognition area BB$_1$, an orthographic projection of the gate IC 107 on the pattern recognition substrate 101 does not overlap the orthographic projection of the anti-static layer 102 on the pattern recognition substrate 101, so as to prevent the anti-static layer 102 from interfering with the normal work of the gate IC 107. The second non-pattern recognition area BB$_2$ may be provided with the conductive structure 105, so as to ensure that there is enough space to arrange the conductive structure 105, so that the conductive structure 105 has a large contact area with the conductive layer 1021, thus facilitating electrostatic discharge. Optionally, in the second non-pattern recognition area BB$_2$, the orthographic projection of the conductive structure 105 on the pattern recognition substrate 101 approximately coincides with the orthographic projection of the anti-static layer 102 on the pattern recognition substrate 101 (that is, it coincides exactly or is within an error range caused by factors such as production and measurement), so as to ensure that the conductive structure 105 has a large contact area with the conductive layer 1021. Of course, in some embodiments, the position of the conductive structure 105 may further be flexibly arranged according to actual needs, which is not specifically limited here.

In some embodiments, in the above pattern recognition module provided by the embodiments of the present disclosure, as shown in FIG. 8 an FIG. 10, the first non-pattern recognition area BB$_1$ may further be provided with the conductive structure 105, so that the contact area between the conductive structure 105 and the conductive layer 1021 is further increased. In addition, in order to avoid short circuit between the conductive structure 105 and the gate IC 107, in the first non-pattern recognition area BB$_1$, the conductive structure 105 may be located between the gate IC 107 and the pattern recognition area AA, specifically, in the first non-pattern recognition area BB$_1$, the orthographic projection of the conductive structure 105 on the pattern recognition substrate 101 approximately coincides with the orthographic projection of the anti-static layer 102 on the pattern recognition substrate 101 (that is, it coincides exactly or is within an error range caused by factors such as production and measurement).

In some embodiments, in the above pattern recognition module provided by the embodiments of the present disclosure, the conductive structure 105 may be conductive foam, metal and other materials with good conductivity.

Figure 12:
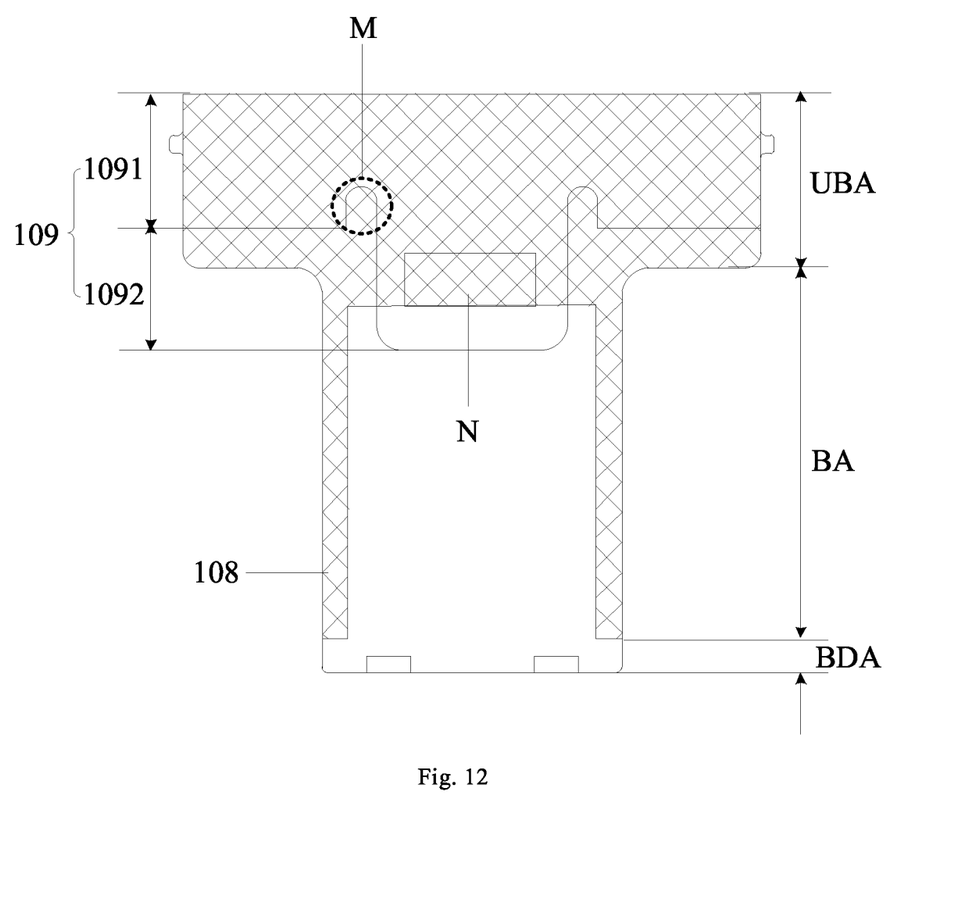
FIG. 12 is a top view of a flexible printed circuit and a stiffening plate provided by an embodiment of the present disclosure.

In some embodiments, the above pattern recognition module provided by the embodiments of the present disclosure, as shown in FIG. 8 and FIG. 10, may further include a flexible printed circuit (FPC) board 108, the flexible printed circuit board 108 is electrically connected with the gate IC 107, for example, the flexible printed circuit board 108 may be electrically connected with the gate IC 107 through a metal line, so as to control the gate IC 107. As shown in FIG. 12, the flexible printed circuit board 108 includes a bent area BA, and a length of the bent area BA is larger than or equal to 14 mm. In the related art, the length of the bent area BA of the flexible printed circuit board 108 is 3.5 mm, in an actual application process, a bonding area BDA on the flexible printed circuit board 108 used to electrically connect the gate IC 107 may be loosened, and fingerprint imaging is affected. In the present disclosure, the length of the bent area BA is increased to more than 14 mm, bending stress is reduced, the bonding area BDA is prevented from loosening due to excessive bending stress, so that a bonding effect between the flexible printed circuit board 108 and the gate IC 107 is ensured, which is conducive to improving the fingerprint imaging quality.

In some embodiments, in the above pattern recognition module provided by the embodiments of the present disclosure, as shown in FIG. 12, the flexible printed circuit board 108 may be of a copper grid structure, so that the flexible printed circuit board 108 is easier to bend without generating large bending stress, which greatly reduces the probability of occurrence of bond defects due to excessive bending stress.

In some embodiments, the above pattern recognition substrate 101 provided by the embodiments of the present disclosure, as shown in FIG. 12, may further include a stiffening plate 109, and the stiffening plate 109 includes a body part 1091 and a handle part 1092 which are integrally arranged. The flexible printed circuit board 108 further includes an unbent area UBA, the unbent area is attached to the body part 1091, and the handle part 1092 is located on a side of the body part 1091 adjacent to the bent area BA. The stiffening plate 109 in the related art only has the body part 1091, in the present disclosure, by adding the handle part 1092 in the stiffening plate 109, it is convenient to control the fixed connection between the flexible printed circuit 108 and a field programmable gate array (FPGA) through the handle part 1092.

In some embodiments, in the above pattern recognition module provided by the embodiments of the present disclosure, the handle part 1092 includes a hollowed-out structure N, so as to facilitate grasping the handle part 1092 at the hollowed-out structure N.

In some embodiments, in the above pattern recognition module provided by the embodiments of the present disclosure, as shown in FIG. 12, the body part 1091 may include a crack arrest groove M, and the crack arrest groove M may be arranged adjacent to two sides of the handle part 1092 in an extension direction. In this way, tearing caused in the connection between the handle part 1092 and the body part 1091 when the handle part 1092 is pulled can be effectively prevented.

In some embodiments, the above pattern recognition module provided by the embodiments of the present disclosure, as shown in FIG. 2, may further include a chip-on-film 110 (COF) and a readout integrated circuit IC 111 (ROIC), wherein the ROIC 111 is arranged on the chip-on-film 110, and is electrically connected with the chip-on-film 110; and the non-pattern recognition area BB includes a third non-pattern recognition area $BB_3$ and a fourth non-pattern recognition area $BB_4$ which are arranged opposite to each other, the third non-pattern recognition area $BB_3$ is connected with the first non-pattern recognition area $BB_1$ and the second non-pattern recognition area $BB_2$, the fourth non-pattern recognition area $BB_4$ is connected with the first non-pattern recognition area $BB_1$ and the second non-pattern recognition area $BB_2$, and the third non-pattern recognition area $BB_3$ and the fourth non-pattern recognition area $BB_4$ are both provided with the chip-on-films 110.

In some embodiments, the above pattern recognition module provided by the embodiments of the present disclosure, as shown in FIG. 4, further includes a black adhesive 112, wherein the black adhesive 112 is located on a side of the ROIC 111 away from the chip-on-film 110, and an orthographic projection of the ROIC 111 on the chip-on-film 110 is located within an orthographic projection of the black adhesive 112 on the chip-on-film 110. Since a material of the ROIC 111 belongs to a photosensitive material, the black adhesive 112 covering the ROIC 111 can play a light shielding role, so that the ROIC 111 will not be affected under strong light irradiation. Optionally, the black adhesive 112 may be a black anti electromagnetic interference adhesive (EMI) to realize electromagnetic shielding and prevent electromagnetic interference by using the anti-electromagnetic characteristic of the black anti electromagnetic interference adhesive.

In some embodiments, in the above pattern recognition module provided by the embodiments of the present disclosure, as shown in FIG. 1, FIG. 3, FIG. 6, FIG. 7 and FIG. 9, the anti-glare layer 103 is at least arranged in the pattern recognition area AA. Optionally, the anti-glare layer 103 is configured to cut off ambient light within a range of 500 nm to 780 nm. By intercepting the light within the range of 500 nm to 780 nm, it is still possible to collect images normally in the outdoor environment with strong light, which is adaptive to the needs of outdoor use. In some embodiments, in order not to affect the image collection, a thickness of the anti-glare layer 103 in the direction perpendicular to the pattern recognition substrate 101 is larger than or equal to 2 μm and less than or equal to 10 μm, for example, it may be 2 μm, 3 μm, 4 μm, 5 μm, 6 μm, 7 μm, 8 μm, 9 μm, 10 μm and the like. The anti-glare layer 103 may be made of resin and other materials that can absorb the light in an infrared band.

It should be noted that in the related art, a photosensitive device contained in the pattern recognition substrate is of a PIN structure made of amorphous silicon (a-si), and the amorphous silicon does not absorb wavelengths of more than 780 nm. Therefore, the anti-glare layer 103 in the present disclosure does not need to cut off the wavelengths of more than 780 nm. During specific implementation, the infrared wave band required to be cut off by the anti-glare layer 103 may be selectively set according to an external quantum efficiency (EQE) curve of the material used for the photosensitive device, so as to ensure that the photosensitive device only receives the light reflected by the fingerprint, and does not receive the ambient light passing through the fingers, to improve the image collection quality.

In some embodiments, in the above pattern recognition module provided by the embodiments of the present disclosure, the orthographic projection of the anti-glare layer 103 on the pattern recognition substrate 101 may be larger than the pattern recognition area AA and located within the orthographic projection of the anti-static layer 102 on the pattern recognition substrate 101, to effectively avoid the influence of the external strong light on the image collection of the photosensitive device in the pattern recognition area AA.

In some embodiments, in the above pattern recognition module provided by the embodiments of the present disclosure, as shown in FIG. 1, and FIG. 3 to FIG. 11, an orthographic projection of the first protective layer 104 on the pattern recognition substrate 101 is larger than the pattern recognition area AA and located within the orthographic projection of the anti-glare layer 103 on the pattern recognition substrate 101, to expose the anti-static layer 102 outside the anti-glare layer 103, so that the conductive layer 1021 contained in the anti-static layer 102 may be in contact with the grounding shell 106 through the conductive structure 105, grounding connection is realized, and the static electricity is guided away. The surface hardness of the pattern recognition module is improved through the material characteristics of the first protective layer 104, so as to prevent surface scratches from affecting the imaging. The first protective layer 104 in the present disclosure is a film layer with silicon, oxygen and nitrogen as main elements, for example, a material of the first protective layer 104 may include silicon nitride, or the material of the first protective layer 104 may include silicon nitride and silicon oxide. The larger the thickness of the first protective layer 104, the larger its corresponding hardness, but the increase in thickness will affect the image quality. Therefore, in order to give consideration to both hardness and image quality, the thickness of the first protective layer 104 may be larger than or equal to 300 nm and less than or equal to 10000 nm, for example, it may be larger than or equal to 300 nm and less than or equal to 600 nm. The increase of nitrogen (N) will increase the hardness of the first protective layer 104. The content of nitrogen in the first protective layer 104 of the present disclosure is larger than or equal to 60%, and the hardness of the first protective layer 104 is larger than or equal to 6 H. During specific implementation, the first protective layer 104 may be adjusted according to the material of a base below it (including the anti-glare layer 103 and the anti-static layer 102). The lower the substrate hardness, the higher the nitrogen content of the first protective layer 104, and the larger the thickness of the first protective layer 104. Therefore, improving the hardness of the base material is also a way to improve the overall hardness. The anti-glare layer 103 in the present disclosure is made of resin with poor hardness. If it is replaced with a material with consistent transmissivity and high hardness, the overall hardness will further increase, and the scratch resistance will be better.

In some embodiments, the above pattern recognition module provided by the embodiments of the present disclosure, as shown in FIG. 1, and FIG. 3 to FIG. 11, may further include a second protective layer 113, the second protective layer 113 is located on a side of the first protective layer 104 away from the anti-static layer 102, so as to prevent the influence of fingerprint residues on the imaging. Optionally, an orthographic projection of an anti-fingerprint residue film on the pattern recognition substrate 101 approximately coincides with the orthographic projection of the first protective layer 104 on the pattern recognition substrate 101, so as to prevent the second protective layer 113 and the first protective layer 104 from completely covering the anti-static layer 102, in other words, part of the anti-static layer 102 in a non-display area may be exposed, so that the conductive layer 1021 contained in the anti-static layer 102 may be in contact with the grounding shell 106 through the conductive structure 105, the grounding connection is realized, and the static electricity is guided away.

It should be noted that in the embodiments provided by the present disclosure, due to the limitation of process conditions or the influence of measurement and other factors, "approximately coincide" may coincide exactly, or there may be some deviations (for example, it has a deviation of ±5 μm), so the relationship of "approximately coincide" between the relevant features, as long as the error is allowed, belongs to the scope of protection of the present disclosure.

In some embodiments, in the above pattern recognition module provided by the embodiments of the present disclosure, the second protective layer 113 is configured to prevent the fingerprint residues, for example, it may be an anti-fingerprint (AF) film or an invisible fingerprint (IF) film. A surface of the anti-fingerprint film is highlighted, and the fingerprint residues are easy to wipe; and a surface of the invisible fingerprint film is frosted, and the fingerprint is not prone to remaining, which can be flexibly selected according to the actual needs specifically.

In some embodiments, in the above pattern recognition module provided by the embodiments of the present disclosure, in order to enhance the anti-fingerprint effect, a thickness of the second protective layer 113 in the direction perpendicular to the pattern recognition substrate 101 is larger than or equal to 100 Å and less than or equal to 500 Å, such as 100 Å, 200 Å, 300 Å, 400 Å and 500 Å.

Based on the same inventive concept, the embodiments of the present disclosure provide a pattern recognition apparatus, including the above pattern recognition module provided by the embodiments of the present disclosure. Since the principle for solving problems of the pattern recognition apparatus is similar to that of the above pattern recognition module, implementation of the pattern recognition apparatus may refer to the embodiments of the above pattern recognition module, and repetitions are omitted herein.

The embodiments of the present disclosure provide a pattern recognition apparatus, as shown in FIG. 9, including a pattern recognition module 001 and a backlight module 002, and the pattern recognition module 001 is the above pattern recognition module 001 provided by the embodiments of the present disclosure, and the pattern recognition module 001 is located on a light emitting side of the backlight module 002. Optionally, a size of the pattern recognition apparatus may be 91.5 mm×90.2 mm, a thickness thereof may be larger than or equal to 3 mm and less than or equal to 7 mm, and the entirety is light and portable. Optionally, in the present disclosure, the backlight module 002 may include a backlight source, and an inverse prism and a privacy film which are arranged in turn on a light emitting side of the backlight source, so as to improve a collimation effect of backlight.

It can be seen from the above contents that in the above pattern recognition module and the pattern recognition apparatus provided by the embodiments of the present disclosure, the anti-glare layer 103 is arranged on the surface of the pattern recognition substrate 101, so that the light of a waveband of 500 nm-780 nm may be cut off, and an anti-glare effect is realized; and the anti-static layer 102 is plated on the anti-glare layer 103, and an anti-static effect is realized. The anti-static layer 102 adopts the design of the conductive layer 1021, which needs to match the connection with the grounding shell 106 to connect the anti-static layer 102 to the ground through the grounding shell 106. The first protective layer 104 is plated on the anti-static layer 102 to improve the hardness of the overall surface and prevent surface scratches from affecting the imaging. The design of the first protective layer 104 needs to be adjusted according to the characteristics of the base resin material. The present disclosure adopts the coating of silicon, nitrogen and oxygen to realize the effect of hardness 6 H. The first protective layer 104 is provided with the second protective layer 113 which prevents the fingerprint residues, the fingerprint residues may be avoided, and user experience is improved. Due to its small size, the pattern recognition apparatus of the present disclosure can resist strong light and fingerprints, and is easy to carry, so it can be used outdoors.

Apparently, those skilled in the art can make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A pattern recognition module, comprising:
a pattern recognition substrate, wherein the pattern recognition substrate comprises a pattern recognition area, and a non-pattern recognition area located on at least one side of the pattern recognition area;
an anti-static layer, located on the pattern recognition substrate, wherein an orthographic projection of the anti-static layer on the pattern recognition substrate completely covers the pattern recognition area and extends to the non-pattern recognition area, and overlaps the non-pattern recognition area; and
an anti-glare layer and a first protective layer, wherein the anti-static layer is disposed between the anti-glare layer and the first protective layer, and the anti-glare layer is arranged adjacent to the pattern recognition substrate.

2. The pattern recognition module according to claim 1, wherein the anti-static layer is a conductive layer.

3. The pattern recognition module according to claim 2, wherein a sheet resistance of the conductive layer is larger than or equal to 10 Ω/□ and less than or equal to 100 Ω/□;
wherein a transmissivity of the conductive layer is larger than 80%; and, wherein a thickness of the conductive layer in a direction perpendicular to the pattern recognition substrate is larger than or equal to 300 Å and less than or equal to 2000 Å.

4. The pattern recognition module according to claim 2, wherein the pattern recognition substrate further comprises a conductive structure, wherein the conductive structure is located on a side of the anti-static layer away from the pattern recognition substrate, and the conductive structure is located in the non-pattern recognition area and arranged in contact with the conductive layer.

5. The pattern recognition module according to claim 4, further comprising a grounding shell, wherein the grounding shell is arranged in the non-pattern recognition area, and is electrically connected with the conductive structure;
wherein a surface of the grounding shell has insulating paint beyond a contact surface with the conductive structure and a grounding point.

6. The pattern recognition module according to claim 4, further comprising a gate drive chip; wherein
the non-pattern recognition area surrounds the pattern recognition area, the non-pattern recognition area comprises a first non-pattern recognition area and a second non-pattern recognition area arranged opposite to each other, the first non-pattern recognition area is provided with the gate drive chip, and the second non-pattern recognition area is provided with the conductive structure;
in the first non-pattern recognition area, an orthographic projection of the gate drive chip on the pattern recognition substrate does not overlap an orthographic projection of the anti-static layer on the pattern recognition substrate; and
in the second non-pattern recognition area, an orthographic projection of the conductive structure on the pattern recognition substrate approximately coincides with the orthographic projection of the anti-static layer on the pattern recognition substrate.

7. The pattern recognition module according to claim 6, wherein the first non-pattern recognition area is further provided with the conductive structure, and in the first non-pattern recognition area, the orthographic projection of the conductive structure on the pattern recognition substrate approximately coincides with the orthographic projection of the anti-static layer on the pattern recognition substrate.

8. The pattern recognition module according to claim 6, further comprising a flexible printed circuit board, wherein the flexible printed circuit board is electrically connected with the gate drive chip, the flexible printed circuit board comprises a bent area, and a length of the bent area is larger than or equal to 14 mm.

9. The pattern recognition module according to claim 8, wherein the flexible printed circuit board is of a copper grid structure.

10. The pattern recognition module according to claim 8, further comprising a stiffening plate, wherein the stiffening plate comprises a body part and a handle part which are integrally arranged; and the flexible printed circuit board further comprises an unbent area, the unbent area is attached to the body part, and the handle part is located on a side of the body part adjacent to the bent area.

11. The pattern recognition module according to claim 6, further comprising a chip-on-film and a readout integrated circuit (ROIC), wherein the ROIC is arranged on the chip-on-film, and is electrically connected with the chip-on-film; and
the non-pattern recognition area comprises a third non-pattern recognition area and a fourth non-pattern recognition area arranged opposite to each other, the third non-pattern recognition area is connected with the first non-pattern recognition area and the second non-pattern recognition area, the fourth non-pattern recognition area is connected with the first non-pattern recognition area and the second non-pattern recognition area, and the third non-pattern recognition area and the fourth non-pattern recognition area are both provided with the chip-on-films.

12. The pattern recognition module according to claim 11, further comprising a black adhesive, wherein the black adhesive is located on a side of the ROIC away from the chip-on-film, and an orthographic projection of the ROIC on the chip-on-film is located within an orthographic projection of the black adhesive on the chip-on-film.

13. The pattern recognition module according to claim 1, wherein the anti-static layer is a high-resistance film.

14. The pattern recognition module according to claim 13, wherein a sheet resistance of the high-resistance film is larger than or equal to $10^8$ Ω/□;
wherein a transmissivity of the high-resistance film is larger than 80%;
wherein a thickness of the high-resistance film in a direction perpendicular to the pattern recognition substrate is larger than or equal to 100 Å and less than or equal to 300 Å; or,
wherein the anti-static layer is of a planar structure or a grid structure.

15. The pattern recognition module according to claim 1, wherein the anti-static layer comprises a conductive layer and a high-resistance film which are arranged in a stacked mode, and the conductive layer is disposed between the pattern recognition substrate and the high-resistance film; and,
wherein an orthographic projection of the high-resistance film on the pattern recognition substrate is located within an orthographic projection of the conductive layer on the pattern recognition substrate.

16. The pattern recognition module according to claim 1, wherein the anti-glare layer is at least arranged in the pattern recognition area;
wherein an orthographic projection of the anti-glare layer on the pattern recognition substrate is larger than the pattern recognition area and located within the orthographic projection of the anti-static layer on the pattern recognition substrate; and,
wherein a thickness of the anti-glare layer in a direction perpendicular to the pattern recognition substrate is larger than or equal to 2 μm and less than or equal to 10 μm.

17. The pattern recognition module according to claim 1, wherein an orthographic projection of the first protective layer on the pattern recognition substrate is larger than the pattern recognition area and located within an orthographic projection of the anti-glare layer on the pattern recognition substrate.

18. The pattern recognition module according to claim 1, wherein a material of the first protective layer comprises silicon nitride, and a hardness of the first protective layer is larger than or equal to 6 H;
wherein the material of the first protective layer further comprises monox, and a nitrogen content in the first protective layer is larger than or equal to 60%; and wherein a thickness of the first protective layer in a direction perpendicular to the pattern recognition substrate is larger than or equal to 300 nm and less than or equal to 10000 nm.

19. The pattern recognition module according to claim 1, further comprising a second protective layer, wherein the second protective layer is located on a side of the first protective layer away from the anti-static layer, and an orthographic projection of the second protective layer on the pattern recognition substrate approximately coincides with an orthographic projection of the first protective layer on the pattern recognition substrate;

wherein the second protective layer is configured to prevent fingerprint residues; and, wherein a thickness of the second protective layer in the direction perpendicular to the pattern recognition substrate is larger than or equal to 100 Å and less than or equal to 500 Å.

20. The pattern recognition module according to claim 1, wherein the anti-static layer comprises a conductive layer and a high-resistance film which are arranged in a stacked mode, and the high-resistance film is disposed between the pattern recognition substrate and the conductive layer.

* * * * *